(12) United States Patent
Chen et al.

(10) Patent No.: US 11,601,758 B2
(45) Date of Patent: Mar. 7, 2023

(54) AUDIO SIGNAL PROCESSING CHIP, MULTICHANNEL SYSTEM, AND AUDIO SIGNAL PROCESSING METHOD

(71) Applicant: REALTEK SEMICONDUCTOR CORPORATION, Hsinchu (TW)

(72) Inventors: Chang-Chih Chen, Hsinchu (TW); Tsung-Peng Chuang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/314,078

(22) Filed: May 7, 2021

(65) Prior Publication Data
US 2022/0070586 A1    Mar. 3, 2022

(30) Foreign Application Priority Data

Sep. 3, 2020  (TW) .................................. 109130256

(51) Int. Cl.
*H04R 5/04* (2006.01)
*H04R 3/12* (2006.01)
*G06F 5/06* (2006.01)
*G06F 3/16* (2006.01)

(52) U.S. Cl.
CPC .............. *H04R 5/04* (2013.01); *G06F 3/165* (2013.01); *G06F 5/06* (2013.01); *H04R 3/12* (2013.01); *H04R 2420/01* (2013.01); *H04R 2430/01* (2013.01)

(58) Field of Classification Search
CPC ........ H04R 5/04; H04R 3/12; H04R 2420/01; H04R 2430/01; H04S 2400/13; H04S 2400/01

USPC .................. 381/1–2, 10–12, 27, 307, 80, 89
See application file for complete search history.

(56) References Cited

U.S. PATENT DOCUMENTS

| | | | |
|---|---|---|---|
| 7,451,006 B2* | 11/2008 | Eid | .......................... H04S 5/005 381/22 |
| 9,088,406 B2 | 7/2015 | Newham et al. | |
| 10,341,773 B2* | 7/2019 | Filippini | ................... H04R 3/12 |
| 10,419,852 B2* | 9/2019 | Amarilio | ................ H03G 3/341 |

(Continued)

FOREIGN PATENT DOCUMENTS

CN          104509023 A       4/2015

OTHER PUBLICATIONS

OA letter of the counterpart I W application (appl. No. 109130256) dated Jan. 25, 2022. Summary of the OA letter: 1. Claims 1-2, 5-7, and 10 are rejected as allegedly being unpatentable in view of cited reference 1 (CN 104509023A, also published as U.S. Pat. No. 9,088,406B2). 2. Claims 3-4 and 8-9 are allowable. Correspondence bewteen claims of TW counterpart application and claims of US application: 1. Claims 1-5, 6-9, and 10 in TW counterpart application correspond to claims 1-2, 4-5, 8, 9-12, and 16 in US application, respectively.

*Primary Examiner* — Disler Paul
(74) *Attorney, Agent, or Firm* — WPAT, PC

(57) ABSTRACT

An audio processing chip includes a detector circuit, a first-in first-out (FIFO) circuit, and an adjustment circuitry. The detector circuit is configured to detect an audio stream to output an enable signal. The FIFO circuit is configured to start outputting audio data corresponding to a channel in the audio stream to be a first signal. The adjustment circuitry is configured to process the first signal, in order to generate an output signal and transmit the output signal to a speaker.

12 Claims, 5 Drawing Sheets

(56) References Cited

U.S. PATENT DOCUMENTS

| | | | |
|---|---|---|---|
| 10,437,552 B2 * | 10/2019 | Amarilio | G10K 11/16 |
| 10,861,462 B2 * | 12/2020 | Simileysky | G10L 15/28 |
| 2022/0014295 A1 * | 1/2022 | Bonde | H04R 5/033 |

* cited by examiner

AUDIO SIGNAL PROCESSING CHIP, MULTICHANNEL SYSTEM, AND AUDIO SIGNAL PROCESSING METHOD

BACKGROUND

1. Technical Field

The present disclosure relates to an audio signal processing chip, especially to an audio signal processing chip, a multichannel system, and an audio signal processing method that detect audio stream to achieve timing synchronization.

2. Description of Related Art

A multichannel system may mix audio signals from multiple speakers to generate a surround sound. In some approaches, the speakers are driven by different amplifier circuits respectively. If these amplifier circuits start processing audio data at different timings, there may be a phase difference between the sounds outputted from the speakers. As a result, a poor mixed sound effect is obtained, which results in a bad user experience.

SUMMARY

In some aspects of the present disclosure, an audio processing chip includes a detector circuit, a first-in first-out (FIFO) circuit, and an adjustment circuitry. The detector circuit is configured to detect an audio stream to output an enable signal. The FIFO circuit is configured to start outputting audio data corresponding to a channel in the audio stream to be a first signal. The adjustment circuitry is configured to process the first signal, in order to generate an output signal and transmit the output signal to a speaker.

In some aspects of the present disclosure, a multichannel system includes a first audio signal processing chip and a second audio signal processing chip. The first audio signal processing chip is configured to process first audio data in an audio stream, in order to generate a first output signal. The second audio signal processing chip is configured to process second audio data in an audio stream, in order to generate a second output signal. Each of the first audio signal processing chip and the second audio signal processing chip includes a detector circuit, a FIFO circuit, and an adjustment circuitry. The detector circuit is configured to detect the audio stream to output an enable signal. The FIFO circuit configured to start outputting a corresponding one of the first audio data and the second audio data to be a first signal. The adjustment circuitry is configured to process the first signal, in order to generate a corresponding one of a first output signal and a second output signal.

In some aspects of the present disclosure, an audio signal processing method includes the following operations: detecting an audio stream to output an enable signal; starting, by a FIFO circuit, outputting audio data in the audio stream to be a first signal; and processing the first signal to generate an output signal and transmit the output signal to a speaker.

These and other objectives of the present disclosure will no doubt become obvious to those of ordinary skill in the art after reading the following detailed description that are illustrated in the various figures and drawings.

DETAILED DESCRIPTION

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system formed with one or more circuits. The term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference numbers.

Figure 1A:
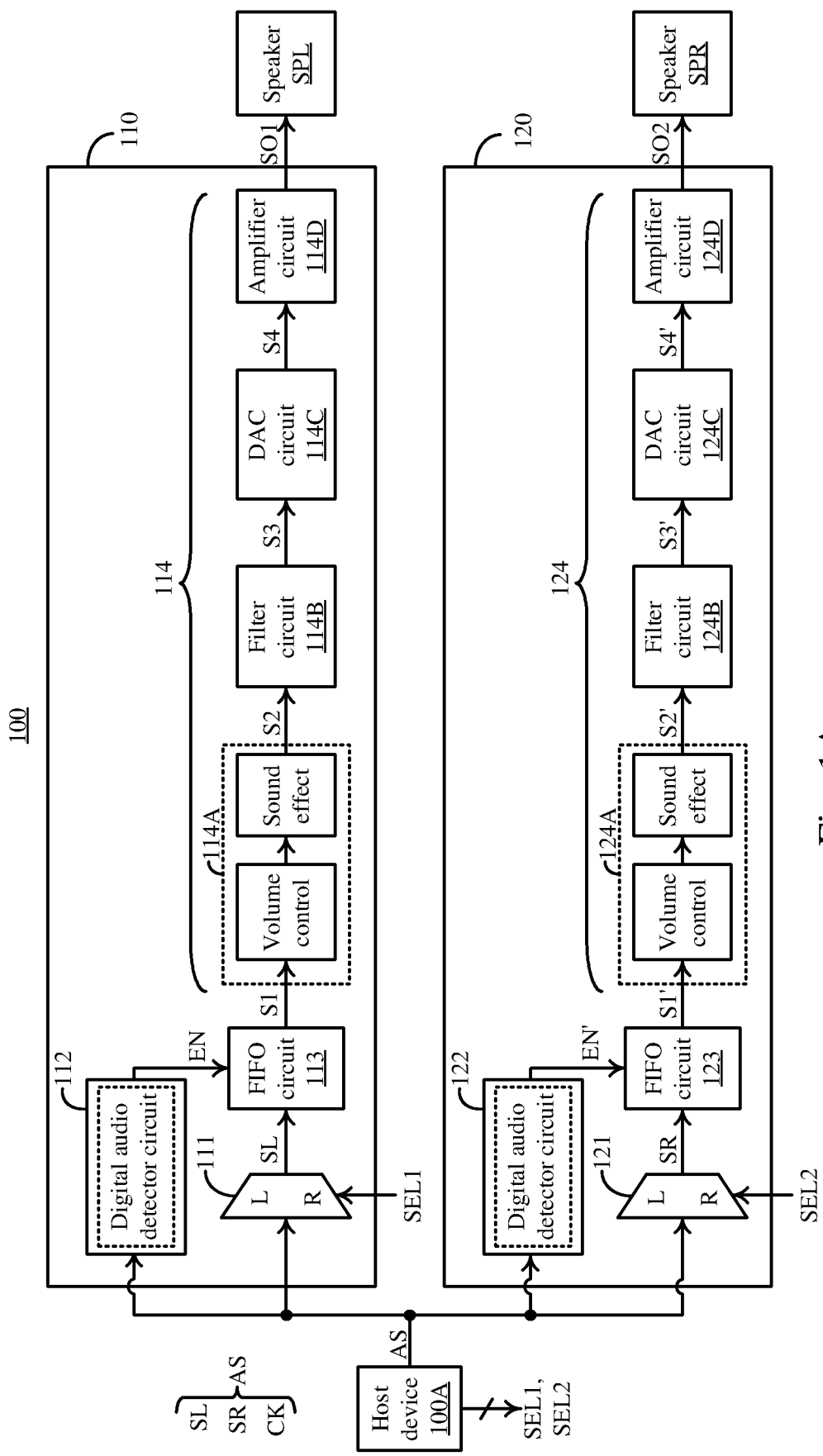
FIG. 1A is a schematic diagram of a multichannel system according to some embodiments of the present disclosure.

FIG. 1A is a schematic diagram of a multichannel system 100 according to some embodiments of the present disclosure. The multichannel system 100 includes a host device 100A, an audio signal processing chip 110, an audio signal processing chip 120, a speaker SPL, and a speaker SPR. The host device 100A may provide audio stream AS. In some embodiments, the host device 100A may be, but not limited to, a music player, a computer, a mobile device, or a portable player.

In some embodiments, the audio stream AS includes a bit clock signal CK, audio data SL corresponding to a left channel, and audio data SR corresponding to a right channel. The audio signal processing chip 110 is configured to process the audio data SL corresponding to the left channel, in order to generate an output signal SO1 and transmit the same to the speaker SPL. The audio signal processing chip 120 is configured to process the audio data SR corresponding to the right channel, in order to generate an output signal SO2 and transmit the same to the speaker SPR. The speaker SPL and the speaker SPR may convert the output signal SO1 and the output signal SO2 to be corresponding sounds respectively.

The audio signal processing chip 110 includes a multiplexer circuit 111, a detector circuit 112, a first-in first out (FIFO) circuit (which is referred to as "FIFO circuit" hereinafter) 113, and an adjustment circuitry 114. The multiplexer circuit 111 may output the audio data SL corresponding to the left channel (labeled as L) in the audio stream AS to the FIFO circuit 113 according to a set signal SEL1 from the host device 100A. The detector circuit 112 may be configured to detect the audio stream AS to output an enable signal EN. In these embodiments, the detector circuit 112 may be a digital audio detector circuit, which may be configured to detect a non-zero data value in the audio stream AS, in order to generate the enable signal EN. Operations regarding herein will be given with reference to FIG. 1B. In some embodiments, the digital audio detector circuit may be implemented with logic circuits and/or a digital signal processor (DSP) circuit. The FIFO circuit 113 operate as a data buffer between the host device 100A and the adjustment circuitry 114. The FIFO circuit 113 is configured to be activated according the enable signal EN, in order to start outputting the audio data SL to be a signal S1, and to transmit the signal S1 to the adjustment circuitry 114. The adjustment circuitry 114 is configured to process the signal S1 to generate the output signal SO1.

In some embodiments, the adjustment circuitry 114 includes a digital signal processor circuit (hereinafter referred to as "DSP circuit" for simplicity) 114A, a filter circuit 114B, a digital to analog converter (DAC) circuit (hereinafter referred to as "DAC circuit" for simplicity), and an amplifier circuit 114D. The DSP circuit 114A is configured to adjust a volume and sound effect of the signal S1, in order to generate a signal S2. The filter circuit 114B is configured to filter the signal S2, in order to reduce noises on the signal S2 and to generate a signal S3. The DAC circuit 114C is configured to convert the signal S3 having analog format to be a signal S4 having digital format. The amplifier circuit 114D amplifies the signal S4 to generate the output signal SO1. The implementations about the adjustment circuitry 114 are given for illustrative purposes, and the present disclosure is not limited thereto.

In some embodiments, the audio signal processing chip 120 includes a multiplexer circuit 121, a detector circuit 122, a FIFO circuit 123, and an adjustment circuitry 124. The multiplexer circuit 121 may output the audio data SR corresponding to the right channel (labeled as R) in the audio stream AS to the FIFO circuit 123 according to a set signal SEL2 from the host device 100A. Similar to the detector circuit 112, the detector circuit 122 may be a digital audio detector circuit, which may detect a non-zero value carried by the audio stream AS to generate an enable signal EN'. The FIFO circuit 123 is activated according to the enable signal EN' to start outputting the audio data SR to be a signal S1', and to transmit the signal S1' to the adjustment circuitry 124. Similar to the adjustment circuitry 114, the adjustment circuitry 124 includes a DSP circuit 124A, a filter circuit 124B, a DAC circuit 124C, and an amplifier circuit 124D. The DSP circuit 124A may adjust a volume and a sound effect of the signal S1' to generate a signal S2. The filter circuit 124B filters the signal S2', in order to reduce noises on the signal S2' and to generate a signal S3'. The DAC circuit 124C converts the signal S3' that is in digital format to be a signal S4' in analog format. The amplifier circuit 124D amplifies the signal S4' to generate the output signal SO2.

In some embodiments, the host device 100A further transfer control signal(s) (e.g., the set signal SEL1 and the set signal SEL2) and/or clock signal(s) to the audio signal processing chip 110 and the audio signal processing chip 120 via a transmission interface (not shown in the figure). The audio signal processing chip 110 and the audio signal processing chip 120 may set configurations of the above circuits with the control signal(s) and/or the clock signal(s). In some embodiments, the above transmission interface may be, but not limited to, an inter-integrated circuit (I2C) bus.

Figure 1B:
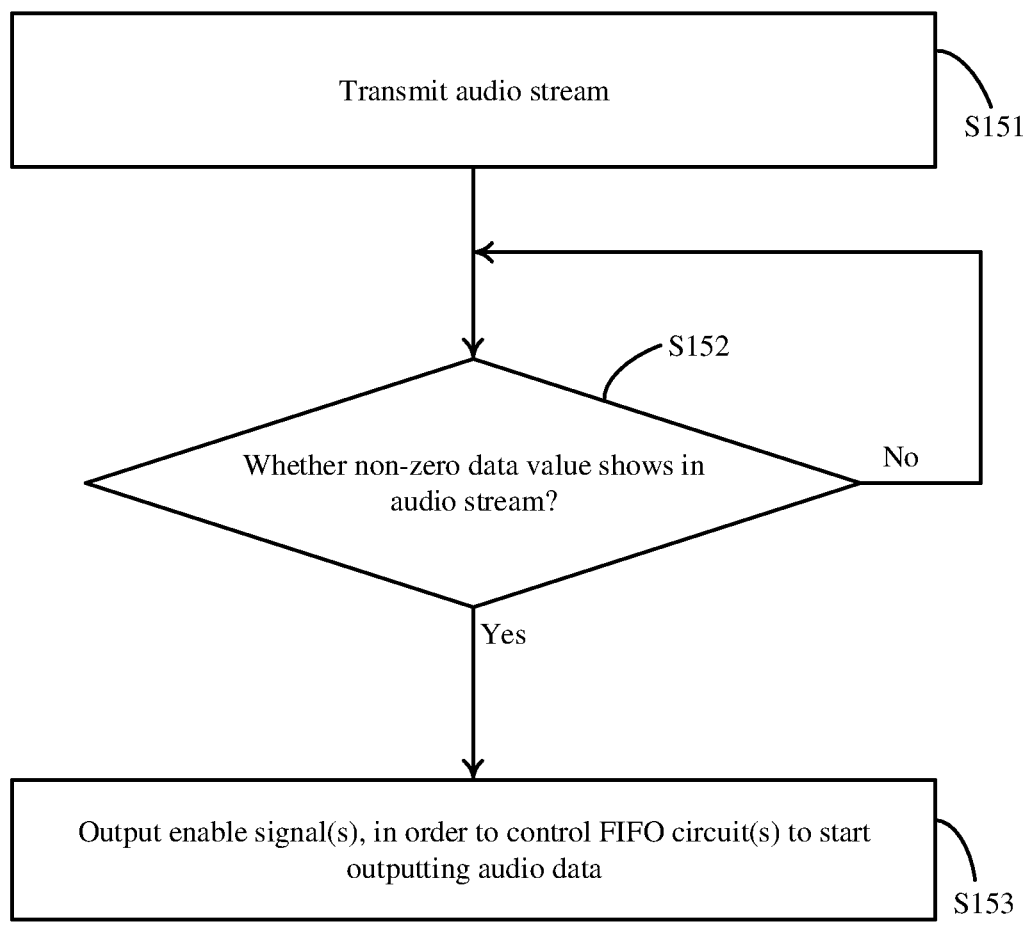
FIG. 1B is a flow chart of operations of the multichannel system in FIG. 1A according to some embodiments of the present disclosure.

FIG. 1B is a flow chart of operations of the multichannel system 100 in FIG. 1A according to some embodiments of the present disclosure. In some embodiments, operation S151 is performed by the host device 100A in FIG. 1A, and operations S152 and S153 are performed by the audio signal processing chip 110 and the audio signal processing chip 120 in FIG. 1A.

In operation S151, a host device (e.g., the host device 100A) transmits audio stream. In operation S152, detector circuit(s) (e.g., the detector circuit 112 and the detector circuit 122) determines whether a non-zero data value shows in the audio stream. If the non-zero data value shows in the audio stream, operation S153 is performed. Alternatively, if the non-zero data value does not show in the audio stream, operation S152 is performed again. In operation S153, an enable signal is outputted to control FIFO circuit(s) (e.g., the FIFO circuit 113 and the FIFO circuit 123) to starting output audio data.

For example, as the audio data carried in the audio stream AS are digital data encoded with pulse-code modulation. As mentioned above, in this example, the detector circuit 112 may be a digital audio detector circuit. The detector circuit 112 may analyze whether the non-zero data value shows in the digital data. In some embodiments, when the non-zero data value shows in the audio stream AS, it indicates that the host device 100A has started transmitting audio to be played. Accordingly, in response to the non-zero data value in the audio stream AS, the detector circuit 112 may output the enable signal EN, in order to control the FIFO circuit 113 to start outputting the audio data SL. Similarly, the detector circuit 122 may output the enable signal EN, in order to control the FIFO circuit 123 to start outputting the audio data SR. With such detection mechanism, the audio signal processing chip 110 and the audio signal processing chip 120 may synchronously process the audio data to generate the output signal SO1 and the output signal SO2. As a result, a phase difference between the output signal SO1 and the output signal SO2 can be reduced, in order to improve the sound effect presented by the multichannel system 100.

In some embodiments, the detector circuit 112 (and/or the detector circuit 122) may store two successive audio data in the audio stream AS, and determine whether a bit transition occurs in a least significant bit (LSB) of each of the two successive audio data. If the bit transition occurs in the LSB of each of the two successive audio data, it indicates that the non-zero data value has shown in the audio stream AS. Alternatively, if the bit transition does not occur, it indicates that the non-zero data value does not show in the audio stream AS. The operations of detecting the non-zero data value are given for illustrative purposes, and the present disclosure is not limited thereto.

Figure 2A:
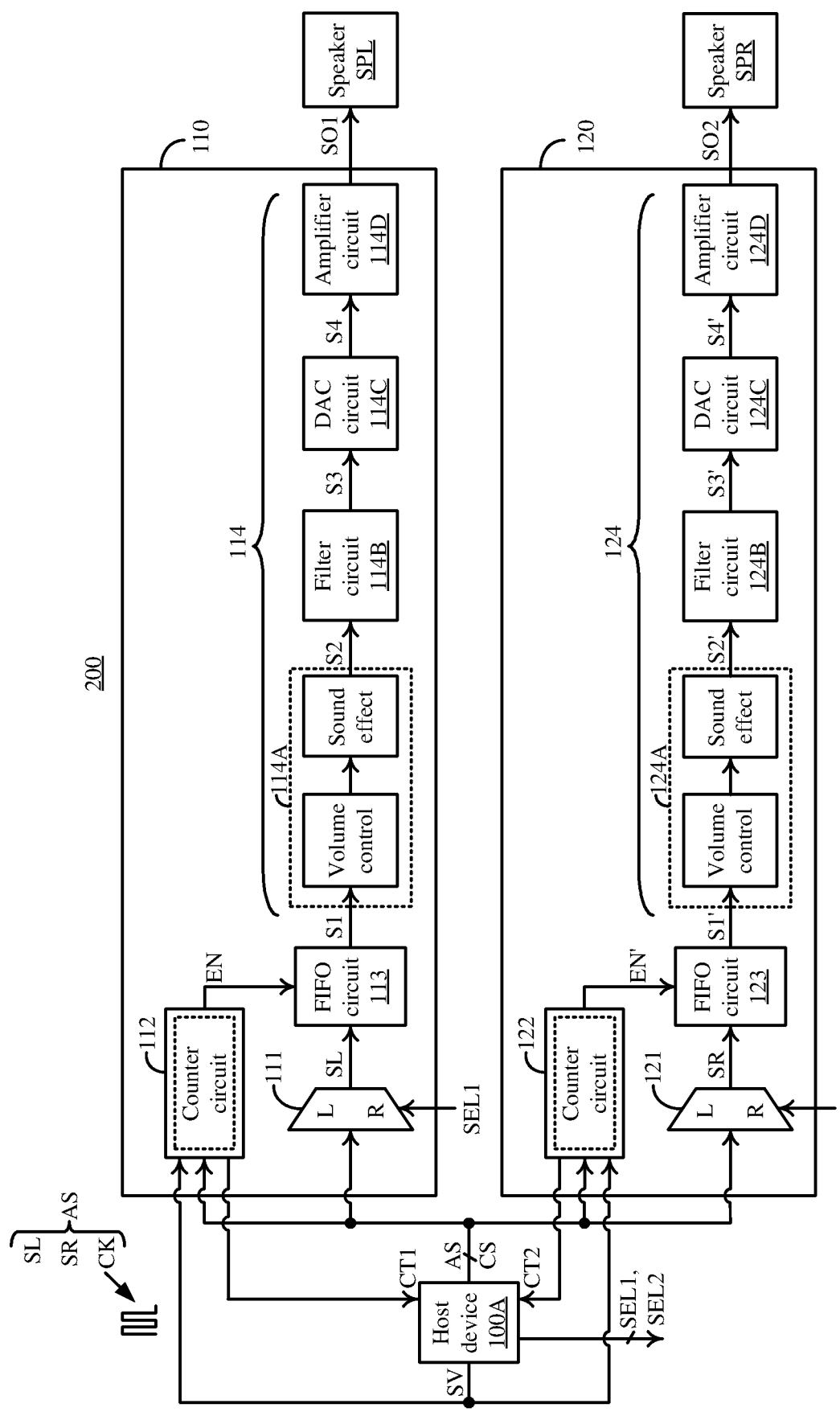
FIG. 2A is a schematic diagram of a multichannel system according to some embodiments of the present disclosure.

FIG. 2A is a schematic diagram of a multichannel system 200 according to some embodiments of the present disclosure. Compared with FIG. 1A, each of the detector circuit 112 and the detector circuit 122 in FIG. 2A is a counter circuit. In this example, the host device 100A is set to have a broadcast function, which may send a synchronization command CS to the audio signal processing chip 110 and the audio signal processing chip 120. In response to the synchronization command CS, the detector circuit 112 detects a clock signal (e.g., the bit clock signal CK) in the audio stream AS, and counts at least one pulse in the clock signal (e.g., the bit clock signal CK) to generate a count value CT1. Similarly, in response to the synchronization command CS, the detector circuit 122 detects the clock signal (e.g., the bit clock signal CK) in the audio stream AS, and counts the at least one pulse of the clock signal (e.g., the bit clock signal CK) to generate the count value CT2. The detector circuit 112 and the detector circuit 122 respectively returns the count value CT1 and the count value CT2 to the host device 100A, and the host device 100A may determine whether to send the valid signal SV according to the count value CT1 and the count value CT2. In this example, the detector circuit 112 and the detector circuit 122 are configured to respectively output the enable signal EN and the enable signal EN' according to the valid signal SV, in order to control the FIFO circuit 113 the FIFO circuit 123 to respectively start outputting the audio data SL and the audio data SR. Related operations will be provided with reference to FIG. 2B.

In this example, each of the detector circuit 112 and the detector circuit 122 detects the clock signal, rather than the audio data, in the audio stream AS. Therefore, operations of the detector circuit 112 and the detector circuit 122 are not limited by timings of receiving the clock signal or the audio data. In some embodiments, as shown in FIG. 2A, the detector circuit 112 is independent to the FIFO circuit 113, and the detector circuit 122 is independent to the FIFO circuit 123. In other embodiments, the detector circuit 112 and the FIFO circuit 113 may be integrated into a single circuit, and the detector circuit 122 and the FIFO circuit 123 may be integrated into a single circuit.

Figure 2B:
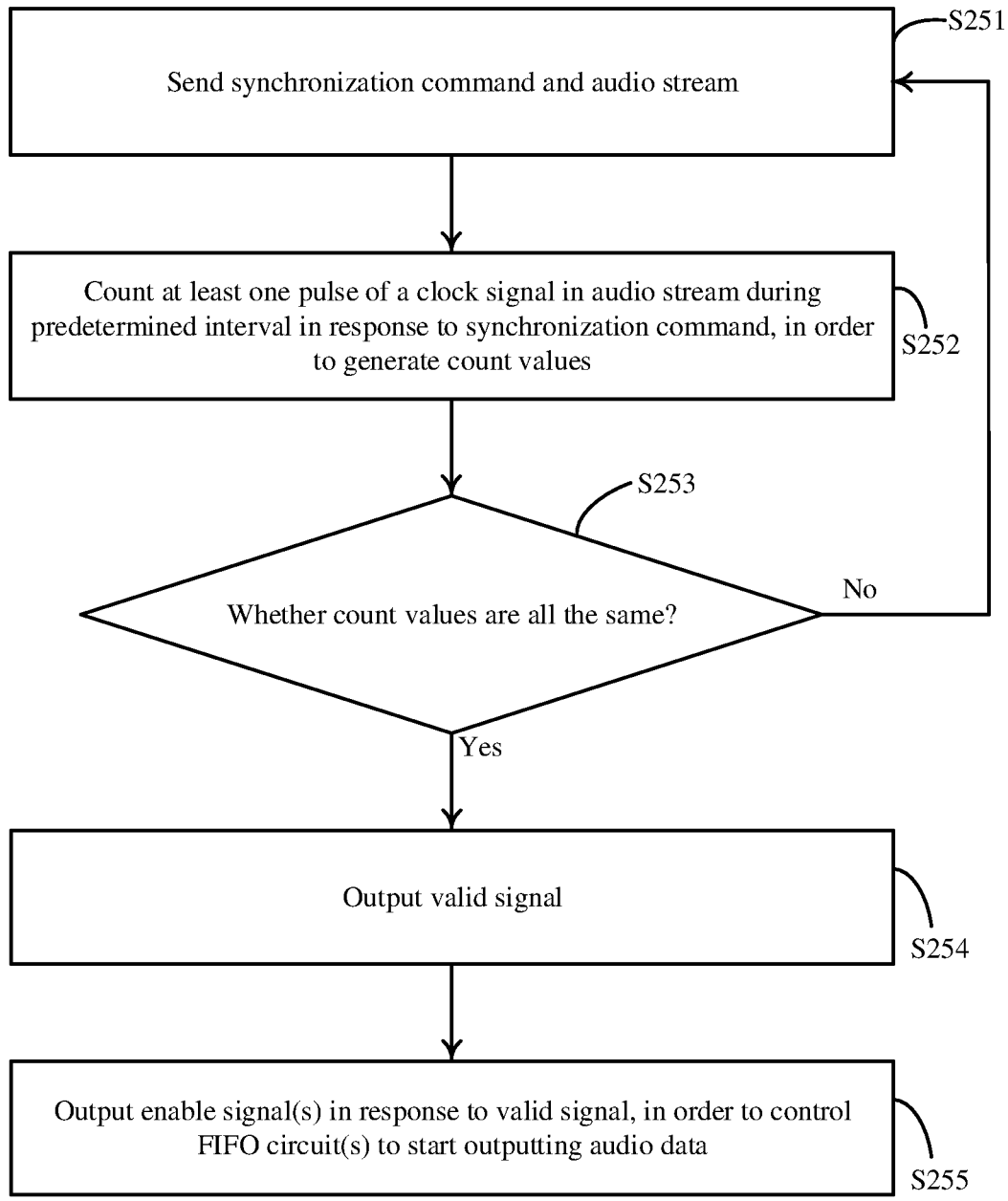
FIG. 2B is a flow chart of operations of the multichannel system in FIG. 2A according to some embodiments of the present disclosure.

FIG. 2B is a flow chart of operations of the multichannel system 200 in FIG. 2A according to some embodiments of the present disclosure. In some embodiments, operation S251, operation S253, and operation S254 are performed by the host device 100A in FIG. 2A, and operation S252 and operation 255 are performed by the audio signal processing chip 110 and the audio signal processing chip 120 in FIG. 2A.

In operation S251, a host device (e.g., the host device 100A) sends a synchronization command and audio stream. In operation S252, detector circuits (e.g., the detector circuit 112 and the detector circuit 122) count at least one pulse of a clock signal in the audio stream during a predetermined interval in response to the synchronization command, in order to generate count values. In operation S253, the host device determines whether the count values are all the same. If the count values are all the same, operation S254 is performed. Alternatively, if there is one count value is different from another count value, the host device performs operation S251 again, in order to send the synchronization command. In operation S254, the host device output the valid signal. In operation S255, the detector circuits output the enable signal(s) in response to the valid signal, in order to control the FIFO circuit(s) (e.g., the FIFO circuit 113 and the FIFO circuit 123) to start outputting audio data.

For example, the clock signal included in the audio stream AS may be the bit clock signal CK. The host device 100A may send the synchronization command CS. In response to the synchronization command CS, the detector circuit 112 and the detector circuit 122 may count at least one pulse in the bit clock signal CK. If the detector circuit 112 and the detector circuit 122 start counting in response to the synchronization command CS in the same time, the count value CT1 generated by the detector circuit 112 during the predetermined interval is equal to the count value CT2 generated by the detector circuit 122 during the predetermined interval. Therefore, if the count value CT1 is equal to the count value CT2, it indicates that the bit clock signal CK received by the audio signal processing chip 110 and that received by the audio signal processing chip 120 have the same phase. Under this condition, the host device 100A may output the valid signal SV. The detector circuit 112 and the detector circuit 122 may respectively output the enable signal EN and the enable signal EN' in response to the valid signal SV, in order to control the FIFO circuit 113 and the FIFO circuit 123 start outputting the audio data SL and the audio data SR.

Alternatively, if the count value CT1 is different from the count value CT2, it indicates that the bit clock signal CK received by the audio signal processing chip 110 and that received by the audio signal processing chip 120 have different phases. Under this condition, the host device 100A may re-send the synchronization command CS. In response to the synchronization command CS, the detector circuit 112 and re-count the bit clock signal CK, in order to update the count value CT1 and the count value CT2. If the updated count value CT1 is identical to the updated count value CT2, the host device 100A outputs the valid signal SV. With such detection mechanism, the audio signal processing chip 110 and the audio signal processing chip 120 are able to synchronously process the audio data to generate the output signal SO1 and the output signal SO2. As a result, the phase difference between the output signal SO1 and the output signal SO2 can be reduced, in order to improve the sound effect presented by the multichannel system 200.

In the above examples, a number of channels, that of the audio signal processing chip, and that of the speakers are given for illustrative purposes, and the present disclosure is not limited thereto. The number of channels, that of the audio signal processing chip, and that of the speakers may be adjusted according to practical applications. For example, the multichannel system 100 (or the multichannel system 200) is not only able to be applied with left channel and right channel, but also bass channel, treble channel, and so on.

Figure 3:
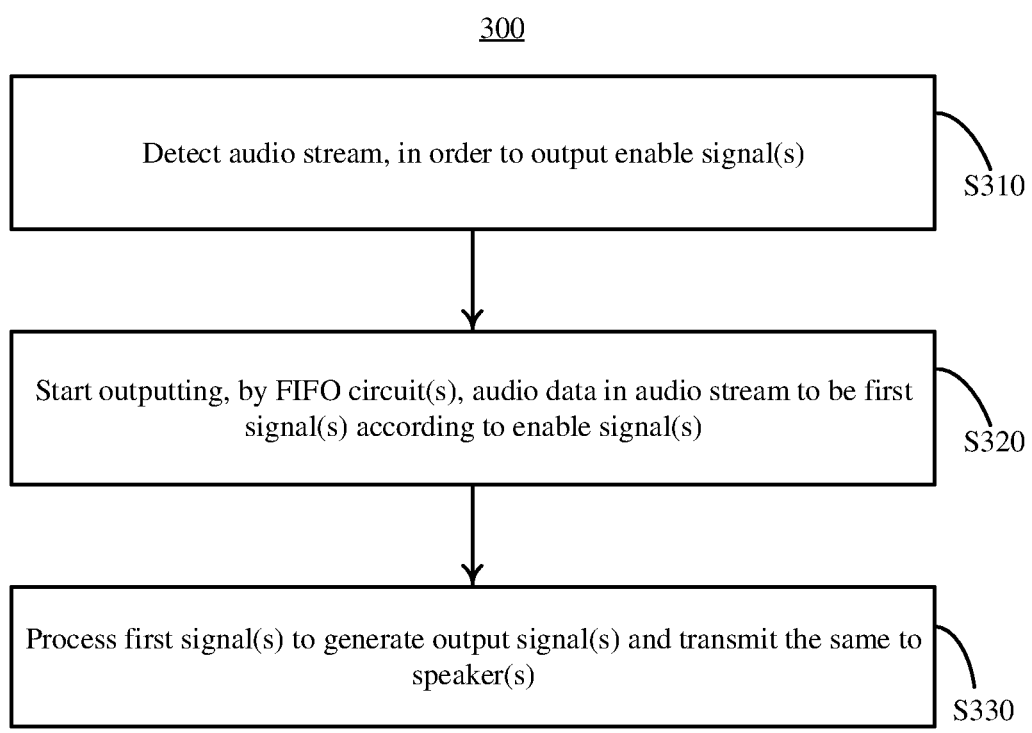
FIG. 3 is a flow chart of an audio signal processing method according to some embodiments of the present disclosure.

FIG. 3 is a flow chart of an audio signal processing method 300 according to some embodiments of the present disclosure. In some embodiments, the audio signal processing method 300 may be, but not limited to, performed by the multichannel system 100 or the multichannel system 200.

In operation S310, the audio stream is detected to output the enable signal(s). In operation S320, the audio data in the audio stream is started outputting by FIFO circuit(s) to be first signal(s) according to the enable signal(s). In operation S330, the first signal(s) is processed to generate output signal(s) and transmitted to speaker(s).

The above description of the audio signal processing method 300 includes exemplary operations, but the operations of the audio signal processing method 300 are not necessarily performed in the order described above. Operations of the audio signal processing method 300 can be added, replaced, changed order, and/or eliminated, or the operations of the audio signal processing method 300 can be executed simultaneously or partially simultaneously as appropriate, in accordance with the spirit and scope of various embodiments of the present disclosure.

As described above, the audio signal processing chip, the multichannel system, the audio signal processing method in some embodiments of the present disclosure may detect audio stream from the host device to achieve synchronization. As a result, phase difference between output signals outputted from various audio signal processing chips can be reduced, in order to improve the sound effect presented by the multichannel system and user experience.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. An audio processing chip, comprising:
a detector circuit configured to detect an audio stream to output an enable signal;
a first-in first-out (FIFO) circuit configured to start outputting audio data corresponding to a channel in the audio stream to be a first signal according to the enable signal; and
an adjustment circuitry configured to process the first signal, in order to generate an output signal and transmit the output signal to a speaker,
wherein the detector circuit is configured to detect a clock signal in the audio stream in response to a synchronization command from a host device, and to count at least one pulse of the clock signal, in order to generate a first count value and transmit the first count value to the host device, the host device is further configured to determine whether to output a valid signal according to the first count value, and the detector circuit is further configured to generate the enable signal in response to the valid signal.

2. The audio processing chip of claim 1, wherein the host device is configured to output the valid signal when the first count value is equal to a second count value from another chip.

3. The audio processing chip of claim 1, wherein the detector circuit is a counter circuit.

4. The audio processing chip of claim 1, wherein if the first count value is different from a second count value from another chip, the host device is configured to output the synchronization command again, and the detector circuit is further configured to re-count the at least one pulse of the clock signal, in order to update the first count value.

5. The audio processing chip of claim 1, wherein the adjustment circuitry comprises:
a digital signal processor circuit configured to adjust a volume and sound effect of the first signal, in order to generate a second signal;
a filter circuit configured to filter the second signal, in order to generate a third signal;
a digital to analog converter circuit configured to convert the third signal to be a fourth signal; and
an amplifier circuit configured to amplify the fourth signal, in order to generate the output signal.

6. A multichannel system, comprising:
a first audio signal processing chip configured to process first audio data in an audio stream, in order to generate a first output signal; and
a second audio signal processing chip configured to process second audio data in an audio stream, in order to generate a second output signal,
wherein each of the first audio signal processing chip and the second audio signal processing chip comprises:
a detector circuit configured to detect the audio stream to output an enable signal;
a first-in first-out (FIFO) circuit configured to start outputting a corresponding one of the first audio data and the second audio data to be a first signal according to the enable signal; and
an adjustment circuitry configured to process the first signal, in order to generate a corresponding one of a first output signal and a second output signal,
wherein the detector circuit is configured to detect a clock signal in the audio stream in response to a synchronization command from a host device, and to count at least one pulse of the clock signal, in order to generate a count value and transmit the count value to the host device, the host device is further configured to determine whether to output a valid signal when the count value from the first audio signal processing chip is identical to the count value from the second audio signal processing chip, and the detector circuit is further configured to generate the enable signal in response to the valid signal.

7. The multichannel system of claim 6, wherein if the count value from the first audio signal processing chip is different from the count value from the second audio signal processing chip, the host device is configured to output the synchronization command again, and the detector circuit is further configured to re-count the at least one pulse of the clock signal in response to the synchronization command, in order to update the count value.

8. The multichannel system of claim 6, wherein the detector circuit is a counter circuit.

9. The multichannel system of claim 6, wherein the adjustment circuitry comprises:
a digital signal processor circuit configured to adjust a volume and sound effect of the first signal, in order to generate a second signal;
a filter circuit configured to filter the second signal, in order to generate a third signal;
a digital to analog converter circuit configured to convert the third signal to be a fourth signal; and
an amplifier circuit configured to amplify the fourth signal, in order to generate the corresponding one of the first output signal and the second output signal.

10. An audio signal processing method, comprising:
detecting an audio stream to output an enable signal;
starting, by a first-in first-out (FIFO) circuit, outputting audio data in the audio stream to be a first signal according to the enable signal; and
processing the first signal to generate an output signal and transmit the output signal to a speaker,
wherein detecting the audio stream to output the enable signal comprises:

detecting a clock signal in the audio stream in response to a synchronization command from a host device, and counting at least one pulse of the clock signal, in order to generate a first count value and transmit the first count value to the host device, wherein the host device is further configured to determine whether to output a valid signal according to the first count value, and the enable signal is generated in response to the valid signal.

11. The audio signal processing method of claim 10, wherein the host device is configured to output the valid signal when the first count value is equal to a second count value from another chip.

12. The audio signal processing method of claim 10, wherein if the first count value is different from a second count value from another chip, the host device is configured to output the synchronization command again, and detecting the audio stream to output the enable signal further comprises:

re-counting the at least one pulse of the clock signal in response to the synchronization command, in order to update the first count value and the second count value.

* * * * *